United States Patent
Wise et al.

(10) Patent No.: US 7,192,001 B2
(45) Date of Patent: Mar. 20, 2007

(54) THERMOPNEUMATIC MICROVALVE

(75) Inventors: Kensall D. Wise, Ann Arbor, MI (US); Joseph A. Potkay, Ann Arbor, MI (US)

(73) Assignee: The Regents of the University of Michigan Office of Technology Transfer, Ann Arbor, MI (US)

( * ) Notice: Subject to any disclaimer, the term of this patent is extended or adjusted under 35 U.S.C. 154(b) by 0 days.

(21) Appl. No.: 10/842,665

(22) Filed: May 10, 2004

(65) Prior Publication Data

US 2005/0001182 A1   Jan. 6, 2005

Related U.S. Application Data (60) Provisional application No. 60/468,868, filed on May 8, 2003.

(51) Int. Cl.
*F16K 31/00* (2006.01)

(52) U.S. Cl. .................. 251/11; 251/61.2; 251/111; 251/129.01; 251/331

(58) Field of Classification Search .................. 251/11, 251/61, 61.1, 61.2, 111, 129.01, 129.05, 331
See application file for complete search history.

(56) References Cited

U.S. PATENT DOCUMENTS

| | | | | |
|---|---|---|---|---|
| 4,318,529 | A * | 3/1982 | Huelle et al. | 251/11 |
| 6,160,243 | A * | 12/2000 | Cozad | 219/439 |
| 6,182,941 | B1 * | 2/2001 | Scheurenbrand et al. | 251/129.04 |
| 6,592,098 | B2 * | 7/2003 | Kao et al. | 251/129.01 |
| 2002/0043638 | A1 * | 4/2002 | Kao et al. | 251/129.06 |

OTHER PUBLICATIONS

Robertson et al., "A Nested Electrostatically-Actuated Microvalve For An Integrated Microflow Controller," MEMS 1994 Proceedings, IEEE Workshop, pp. 7-12 (1994).

Wagner et al., "Micromachined Bistable Valves For Implantable Drug Delivery Systems," 18th Annual International Conference of the IEEE Engineering in Medicine and Biology Society, pp. 254-255 (1996).

(Continued)

*Primary Examiner*—Eric Keasel
*Assistant Examiner*—John K. Fristoe, Jr.
(74) *Attorney, Agent, or Firm*—Marshall, Gerstein & Borun LLP (57) ABSTRACT

A microvalve device includes a semiconductor-based valve housing that defines a flow passage, and a valve face disposed within the valve housing and in fluid communication with the flow passage. The microvalve device further includes a thermal expansion actuator that drives movement of the valve face from a first position to a second position relative to the flow passage, and a capacitor that holds the valve face in the second position. The microvalve may also include an insulating layer disposed on portions of the semiconductor-based valve housing, and a capacitance sensor for monitoring a capacitance level to determine when the valve face reaches the second position. Once the sensor indicates that the second position has been reached, power is no longer applied to the thermal expansion actuator such that power is only substantially consumed during the transition from the first position to the second position. The thermal expansion actuator may include a heating element and a thermal expansion substance for thermopneumatic displacement of the valve face.

13 Claims, 4 Drawing Sheets

OTHER PUBLICATIONS

Wagner et al., "Bistable Microvalve With Pneumatically Coupled Membranes," IEEE, pp. 384-388 (1996).

W.K. Schomburg et al., "Design Optimization Of Bistable Microdiaphragm Valves," Elsevier, Sensors and Actuators A 64, pp. 259-264 (1998).

Capanu et al., "Design, Fabrication and Testing Of A Bistable Electromagnetically Actuated Microvalve," Journal of Microelectromechanical Systems, vol. 9, No. 2, pp. 181-189 (Jun. 2000).

Rich et al., "A High-Flow Thermopneumatic Microvalve With Improved Efficiency and Integrated State Sensing," Journal of Microelectromechanical Systems, vol. 12, No. 2, pp. 201-208 (Apr. 2003).

Collin A. Rich, "A Thermopneumatically-Actuated Silicon Microvalve And Integrated Microflow Controller," Technical Report No. SSEL-308 (2000), Solid State Electronics Laboratory, Department of Electrical Engineering and Computer Science, The University of Michigan, Ann Arbor.

Bergstrom et al., "Thermally Driven Phase-Change Microactuation," Journal of Microelectromechanical Systems, vol. 4, No. 1 (Mar. 1995).

Phillip W. Barth, Ph.D., "Silicon Microvalves For Gas Flow Control," The 8th International Conference on Solid-State Sensors and Actuators, And Eurosensors IX, Stockholm, Sweden, pp. 276-279, (Jun. 1995).

* cited by examiner

THERMOPNEUMATIC MICROVALVE

RELATED APPLICATION

This application claims the benefit of U.S. provisional application entitled "A Latching Thermo-pneumatic Microvalve For Ultra-Low Power Applications," filed May 8, 2003, and having Ser. No. 60/468,868.

STATEMENT REGARDING FEDERALLY SPONSORED RESEARCH OR DEVELOPMENT

This invention was made with government support under Contract No.: EEC-9986866 awarded by the National Science Foundation. The government has certain rights in the invention.

GENERAL FIELD

The disclosure relates generally to microfluidic devices and systems and, more specifically, to microvalves having ultra-low power consumption.

BACKGROUND

Valves and their miniature counterparts, microvalves, control the flow of fluids (e.g., gas or liquids) in fluidic systems. Microvalves have generally improved fluid flow control in applications where the significant power demands of a macro-scale valve would be unsuitable. Microvalves also generally avoid large dead volumes—the undesirable empty space in a valving or other fluidic device that must be pressurized when flow starts and depressurized when flow stops. Microvalves having a small dead volume present faster response times than macro-scale valves. Notwithstanding these improvements from the macro-scale regime, past microvalve designs have left room for improvement in both power consumption and response time, as well as in connection with other valve performance parameters and fabrication considerations.

A number of different microvalve designs and actuation schemes have been introduced. Electromagnetic microactuators have been demonstrated, although magnetic forces scale unfavorably for devices with small volume. Piezoelectric actuators have shown substantial actuation force and fast response times, but have also required large operating voltages and a complex, stacked hybrid construction in order to achieve substantial actuation displacement.

Many commercially available microvalves have relied upon some type of thermal actuation. Unfortunately, shape memory alloy (SMA) and bimetallic thermal actuators (i.e., bimorph structures) have tended to require significant power for actuation, typically hundreds to thousands of milliwatts.

Thermopneumatic microvalves have also been reported, but the typical overall power consumption of such valves has also been undesirably high.

In contrast, microvalves utilizing electrostatic actuation schemes have shown near-zero power consumption. However, such microvalves have been susceptible to particulate contamination and weak actuation force over large distances. Electrostatically actuated microvalves have been unsuitable for applications requiring long valve throw (i.e., large valve travel distances) and accordingly been designed with low-flow rate applications in mind. See, for example, Robertson et al., "A Nested Electrostatically-Actuated Microvalve for an Integrated Microflow Controller," MEMS 1994 Proceedings, IEEE Workshop, pp. 7–12 (1994).

Past microvalves have minimized power consumption through bistable designs, where power is required only during switching. A bistable microvalve taught by Wagner et al. relies upon electrostatic actuation to drive a pair of buckled membranes acted upon pneumatically via a pair of linked cavities. When one membrane is pulled down electrostatically, the other membrane is pushed up pneumatically. Wagner et al., "Micromachined Bistable Valves for Implantable Drug Delivery Systems," 18$^{th}$ Annual International Conference of the IEEE Engineering in Medicine and Biology Society, pp 254–255 (1996). However, such approaches to bistable valves are burdened by complexity in both design and fabrication process, and are also unsuitable for high pressure applications.

SUMMARY OF THE INVENTION

In accordance with one aspect of the invention, a microvalve device includes a semiconductor-based valve housing that defines a flow passage and a valve face disposed within the valve housing and in fluid communication with the flow passage. The microvalve device further includes a thermal expansion actuator that drives movement of the valve face from a first position to a second position relative to the flow passage, and a capacitor that holds the valve face in the second position.

According to one embodiment, the microvalve device may also include an insulating layer disposed on portions of the semiconductor-based valve housing. The capacitor may include a first electrode and a second electrode, where the first electrode is disposed on the valve face and a voltage is applied across the first and second electrodes to electrostatically hold the valve face in the second position. The insulating layer may then be further disposed between the first and second electrodes to prevent contact of the first and second electrodes when the valve face is moved from the first position to the second position.

The microvalve device may still further include a capacitance sensor coupled to the first and second electrodes wherein the capacitance sensor monitors a capacitance level to determine when the valve face reaches the second position. The capacitance sensor generates a signal indicative of the valve face having reached the second position and utilized to discontinue application of power to a heating element of the thermal expansion actuator.

In accordance with another aspect of the invention, a microvalve device includes a semiconductor-based valve housing, a valve face disposed within the valve housing, and an actuator having a heating element that displaces the valve face to effect a transition from a first stable state to a second stable state. The microvalve device further includes a latch that maintains displacement of the valve face in the second stable state.

In one embodiment, the microvalve device further includes a sensor that detects when the transition from the first stable state to the second stable state has occurred. The sensor generates a signal indicative of the transition which is utilized to discontinue heating by the heating element. The latch may include a capacitor where a voltage is applied to a pair of electrodes of the capacitor to activate the latch and hold the microvalve in the second stable state electrostatically. The pair of electrodes may also be coupled to a capacitance level detection circuit of the sensor.

In accordance with yet another aspect of the invention, a method is useful for fluid flow control through a passage in a microvalve having a valve face that rests in a first position. Application of power is provided to an actuator to displace the valve face from the first position to a second position, and the time at which the valve face reaches the second position is sensed. A latch is activated to maintain the valve face in the second position, and the application of power to the actuator is then discontinued.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures, and in which:

DETAILED DESCRIPTION OF PREFERRED EMBODIMENTS

Described herein is a microvalve design having an actuation mechanism complemented by a latch or hold such that the microvalve consumes power only during valve displacement or transitions from one stable state to another stable state. More particularly, the advantages of thermal-based actuation are combined with the benefits of electrostatic latching to provide bi-stable microvalve functionality with ultra-low power consumption. Further efficiencies are gained through the use of a sensor to determine accurately when power should no longer be applied to the thermal-based actuation mechanism such that power is only substantially consumed during the transitions. Power consumption during the transitions may also minimized with an insulated cavity that prevents unnecessary heating of the device outside of the actuation mechanism as described in greater detail hereinbelow.

Thermal-based actuation such as thermopneumatic drive mechanisms provide high force, small size, large valve throw, and relatively high speed (i.e., fast response times). These operational characteristics are augmented by the additional advantage of low power consumption brought about by an integrated sensor that determines when a latch should be activated. This combination of high performance with low power consumption makes the disclosed microvalve design ideal for wireless applications, such as a low-power wireless gas chromatography system. The microvalve is, however, also well suited for any number of other applications and operation in other contexts for the reasons already identified, as well as a robust design capable of batch fabrication via the fabrication sequences described below.

Figure 1:
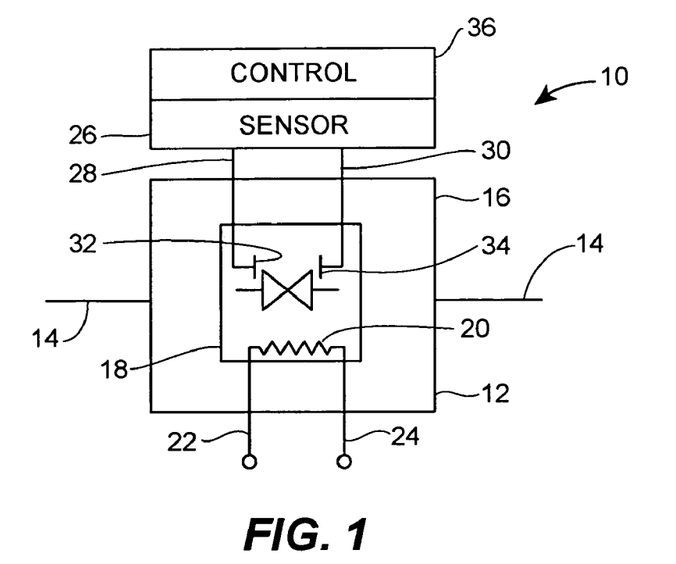
FIG. 1 is a schematic representation of a microvalve in accordance with one embodiment.

With reference now to FIG. 1, an integrated microflow controller indicated generally at 10 includes a microvalve 12 for regulating flow through a flow passage 14. The microvalve 12 has a valve housing shown schematically at 16 that defines a portion of the flow passage 14 as it passes through the microvalve 12. The valve housing 16 and more generally the microvalve 12 may be integrated or coupled with the flow passage 14 in any number of ways not critical to operation but well known to those skilled in the art. Furthermore, the microvalve 12 is bi-directional such that operation is not limited by flow direction or a distinction between inlet or outlet.

The microvalve 12 has a thermal expansion actuator having a region 18 where heat is applied by a heating element, such as a resistive heater 20. The region 18 may be insulated as described in more detail below to improve performance and efficiency. Lines 22 and 24 supply current from a power source (not shown) that may act as the common source for all components of the microflow controller 10.

In this embodiment, the microvalve 12 rests in the open position, and current supplied to the resistive heater 20 displaces a valve face (see, e.g., FIG. 2) through thermal expansion of a thermal expansion substance disposed in the region 18. Such displacement then drives the microvalve 12 to the closed position.

Positioning in the closed state is stable because the microvalve of FIG. 1 also includes an electrostatic latch (see, e.g., FIG. 2) and a sensor circuit 26 that determines when to activate the latch. The sensor circuit 26 is depicted schematically to include a pair of lines 28, 30 coupling the circuit to a pair of electrodes 32, 34, respectively, which are, in general, coupled to elements of the microvalve 12 for measurement of valve position. With the electrodes 32 and 34 disposed on, for example, a valve face and seat (see, e.g., FIG. 2) of the microvalve 12, the sensor circuit 26 is a capacitance level sensor. In this case, the sensor circuit 26 monitors the capacitance to determine the distance between the two electrodes 32, 34, which decreases as the microvalve 16 is displaced by the thermal expansion actuator. As will be shown in greater detail below, the distance is indicative of the state of the microvalve 12, or the positioning of the valve face and, therefore indicative of whether the microvalve 12 has closed the flow passage 14.

In this embodiment, the same lines 28, 30 carrying a signal indicative of valve position may also apply a voltage across the electrodes 32, 34 to latch, or hold, the microvalve 12 in the closed position. Waiting until the microvalve 12 has reached the closed position to apply the voltage is advantageous because it avoids the contamination problems that plague other electrostatically based microvalves. That is, particles present in the flow channel may be electrostatically attracted and then attach to the electrodes of the valve. Such particles in the flow passage 14 will not be present between the electrodes 32, 34 because the microvalve 12 will already be closed.

A control 36 is responsive to the signal generated by the sensor circuit 26 to determine when to apply the voltage across the electrodes 32, 34. As is well known to those skilled in the art, the sensor 26 and the control circuit 36 may, but need not, be integrated to any greater or lesser extent. The sensor 26 and control circuits 36 may be incorporated, for instance, in a single circuit capable of sensing capacitance and sourcing voltage at the same time. Generally speaking, however, the sensor 26 and/or the control circuit 36 analyze the signal generated at the electrodes 32, 34 using feedback to sense the change in state. The same analysis may be utilized for calibration purposes.

In operation, fluid flow control is achieved by providing power to the actuation mechanism—in this case, the resistive heater 20—to displace the valve face from the stable rest position to the closed position. The sensor 26 may determine that the capacitance level has reached a threshold indicative of the closed position, at which time the latch is activated to maintain the valve face in that position. Application of power to the resistive heater 20 may then be discontinued once the latch is activated. From that point, the microvalve 12 resides in a stable state (i.e., the closed position) without any further significant consumption of power, if any.

The foregoing steps may be performed at the direction of the control 36 and, more generally, may be implemented through hardware, software, firmware, or any combination thereof.

Figure 2:
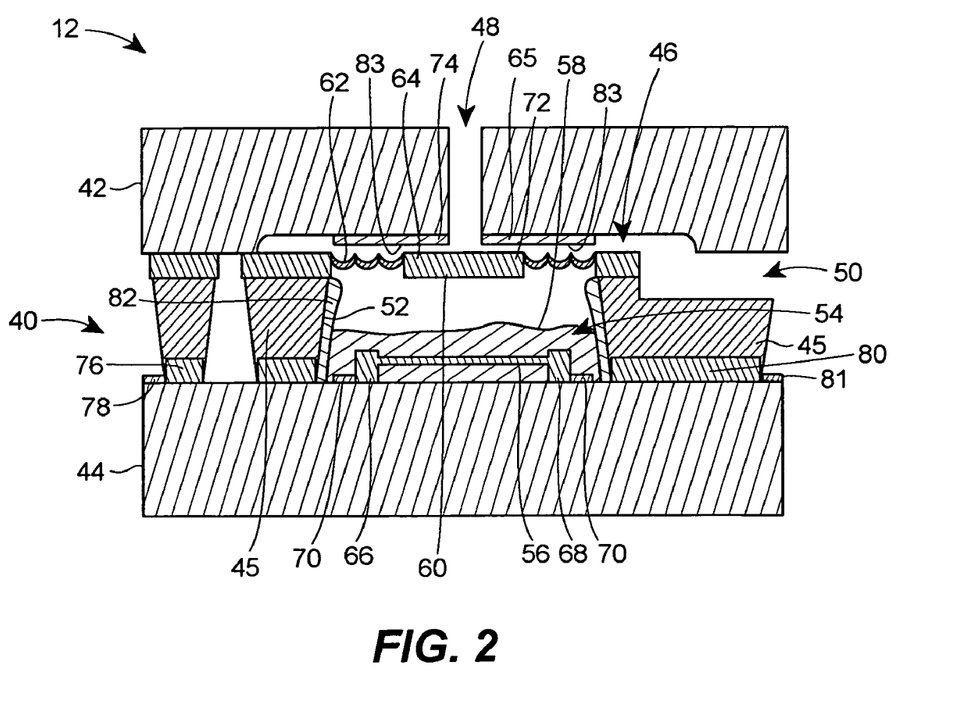
FIG. 2 is a schematic, cross-sectional illustration of the microvalve of FIG. 1 in greater detail.

FIG. 2 depicts the microvalve 12 in greater detail as a microfabricated device assembly having a number of components, including multiple semiconductor (e.g., silicon) microstructures indicated generally at 40 and a pair of glass caps 42, 44. The microvalve 12 is therefore semiconductor-based insofar as typical semiconductor device fabrication processes are used to fabricate the device from one or more silicon substrates. The silicon microstructures are anodically-bonded to the glass caps 42, 44 to define a valve housing or body 45 that includes a flow channel or passage indicated generally at 46 with a pair of fluidic ports 48, 50. Interior walls 52 of the valve housing also define a sealed actuation cavity indicated generally at 54, which may correspond with the region 18 (FIG. 1) in which heat is applied by a resistive heater 56.

The resistive heater 56 transfers energy to a substance contained within the cavity 54 and depicted schematically in FIG. 2 as a liquid 58 in which the heater 56 is immersed. The substance need not take the form of a liquid as-shown, but rather may start or reside as a solid or gas prior to heating. The substance is capable of thermal expansion and, in the specific cases of gases and solids, may not require or undergo a phase change to do so. In the general case of a fluidic thermal expansion substance or a solid substance that will be vaporized, the resistive heater 56 increases the vapor pressure of the fluid in the cavity 54 to provide thermopneumatic actuation. More particularly, the sealed cavity 54 maintains the thermal expansion substance 58 in a saturated liquid-vapor phase such that temperature determines the vapor pressure. A small quantity of working fluid may be all that is needed, inasmuch as elimination or reduction of excess working fluid decreases system thermal mass, thereby improving the transient response. In one embodiment, the amount of fluid used would completely evaporate upon reaching the peak pressure within the actuation cavity 54, yet be sufficient to recoat the resistive heater 56 upon cool-down and re-condensation. Other thermal expansion schemes may be used.

In general, the thermal expansion substance drives or displaces a movable valve plate 60 relative to the flow passage 46. The valve plate 60 is suspended above the actuation cavity 54 via a corrugated silicon membrane or diaphragm 62. The corrugated nature of the membrane 62 provides a compliant structure with greatly increased deflection (>50 microns) capability but with relatively small actuation force as compared to other flat silicon or thin-film diaphragms. The valve plate 60 has a face or surface 64 that eventually occludes the flow passage 46 after displacement or deflection brings the valve face 64 in contact with a valve seat 65. The membrane or diaphragm 62 need not include a corrugated portion if, for example, stiffness is reduced for other structural or geometric reasons.

Further information regarding the capabilities and characteristics of the corrugated membrane and the deflection of the valve face 62 may be found in the microvalve literature directed to thermopneumatic valve actuation schemes and well known to those skilled in the art.

The resistive heater 56 may take the form of one or more grids or other structures having shapes with large surface area for contact with the thermal expansion substance 58. In one exemplary embodiment, the grid may include a lattice (not shown) of 100 micron beam segments forming diamond-shaped pores. Each beam has a 4 micron wide cross-section, where each beam includes a bulk silicon (doped) frame that may also serve as the heating element. Other materials may be used either alone or in combination with the doped silicon, such as a dielectrically insulated polysilicon layer. Such polysilicon or other layers may provide for independent control of the heater resistance (rather than being limited to the frame doping level). As will be explained below in connection with one embodiment, the frame doping is set to ensure an adequate etch stop. More generally, the resistive heater 56 may be suspended or elevated above the lower glass cap 44 by a pair of posts 66, 68. Elevation of the heat generating components of the heater 56 (e.g., approximately, for example, 9 microns) helps to avoid direct heat conduction to the glass cap 44. In the case of a resistive grid of heating elements, heater electrode contacts 70 may spread out into a number of fingers (not shown), each of which is coupled to one of the posts 66, 68, which are in turn coupled to the grid. Such multiple contact points to the posts 66, 68 provide for reduced contact resistance and improve the likelihood of good contacts generally.

With continued reference to FIG. 2, the microvalve 12 further includes a capacitor having a top electrode 72 disposed on the valve face 64 and a bottom electrode 74 disposed on the valve seat 65. The electrodes 72, 74 of the capacitor are coupled to a power source (not shown) to latch electrostatically the microvalve 12 in the closed state or position. More particularly, a voltage is applied across the electrodes 72, 74 when the sensor 26 (FIG. 1) detects that the valve position has reached the closed state. To this end, the sensor 26 is coupled to the electrodes 72, 74 via lines (not shown) that eventually lead to contacts on the lower glass cap 44. The line for the bottom electrode 74 includes a lead transfer portion 76 to a contact 78 on the glass cap 44. The line for the top electrode 72 also includes a lead transfer portion 80 contained within the valve body 45 to a contact 81 on the glass cap 44.

A dielectric layer 83 of the capacitor is shown on the electrode 74 in FIG. 2 in the interest of clear illustration of the valve components. That said, the dielectric layer 83 is disposed between the electrodes 72, 74 and therefore may be disposed on either the valve face 64 or the valve seat 65, or both. When the microvalve reaches the closed position or state, the thickness of the dielectric layer 83 may correspond with the distance separating the electrodes 72, 74, as well as form the seal that occludes the flow passage 50. As a result, a thin dielectric may be desirable in certain cases in the interest of reducing the required latching voltage or increasing the strength of the latching force. A thin silicon dioxide layer may be deposited or grown to this end.

In one embodiment, an insulator is deposited in the cavity 54 to reduce heat loss to the valve body 45 and other device components outside of the cavity 54. The insulator may include an insulating layer 82 disposed on one or more of the interior walls 52 of the cavity 54. In one exemplary embodiment, the insulating layer 82 is a parylene layer deposited after the device components have been assembled and before the thermal actuation substance 58 is introduced or injected into the cavity 54. The parylene layer may have a thickness of approximately 10 microns. A parylene layer may also act as the dielectric layer 83 for the above-described capacitor, and two separate depositions steps may be used to optimize thicknesses and other characteristics of the respective layers. More generally, performance benefits may result from additional (or other) selective deposition, but for certain cases, such as an embodiment having thin insulator layers (e.g., about 0.5 microns), conformal deposition will still result in a net improvement.

In one embodiment, the insulating layer 82 is a parylene layer having a thickness in a range from about 0.5 microns to about 10.0 microns. Parylene has a very low thermal conductivity of (k=0.0837 W K/m), but any one of a number of insulative materials known to those skilled in the art may be utilized.

Generally speaking, the insulator helps increase the efficiency of the thermal expansion actuation mechanism by directing actuation-based power consumption to heating the cavity and avoiding the heating of the rest of the chip. Operation of a thermally actuated microvalve in a manner that heats up the rest of the chip causes the device speed to be slow. In contrast, cavity-only heating may occur in a time period on the order of tens of milliseconds, and the response time of the device 10 is greatly improved. For example, when the heating is localized to the cavity 54 and the capacitor is used for latching, a power savings of over 99% may be achieved.

Fabrication of the microvalve 12 generally relies upon two substrate assemblies each having a glass cap and semiconductor wafer. The fabrication sequence is shown in FIGS. 3a–3i and 4a–4d. Generally speaking, the valve structures, such as the corrugated valve diaphragm and plate structure, and the non-valve structures, such as the resistive heater, are formed using a combination of shallow and deep boron-diffused silicon with respective ethylene diamine pyrocatechol (EDP) etch steps. As described below, the etch steps remove the bulk of the semiconductor wafers involved and, thus, may be referred to as a dissolved wafer process.

Figure 3A:
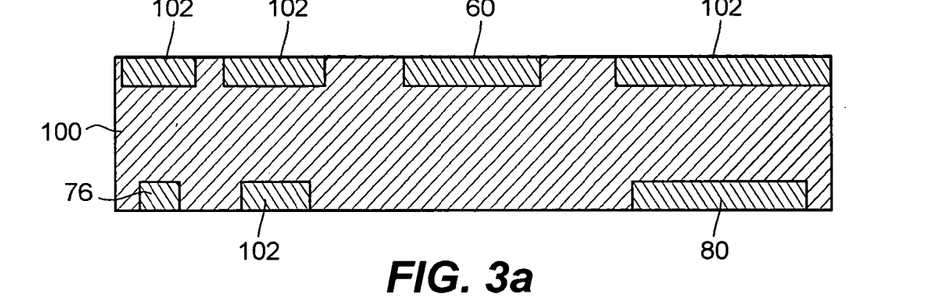
FIGS. 3a–3i are schematic, cross-sectional illustrations of the fabrication sequence for a top substrate assembly of the microvalve of FIG. 2.

FIGS. 3a–3i relate to the fabrication of a top substrate assembly that eventually forms and includes the top cap wafer 42 and the valve body 45 and other portions of the valve structure. As shown in FIG. 3a, a silicon wafer 100 is first patterned for a deep boron diffusion step for both sides of the wafer 100. The boron diffusion step results in a number of regions 102 that will help define the following valve structures after the boron regions act as an etch stop: the valve body 45, the valve plate 60, and the lead transfers 76 and 80. Each boron diffusion region may have a depth of about 10 microns.

Figure 3B:
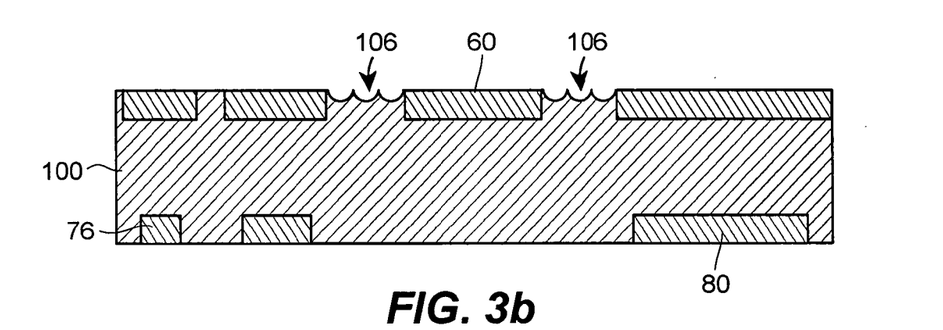

FIG. 3b shows the top substrate assembly after a 10 micron deep isotropic RIE etch step has been performed to define a corrugation profile indicated generally at 106 for the corrugated membrane 62.

Figure 3C:
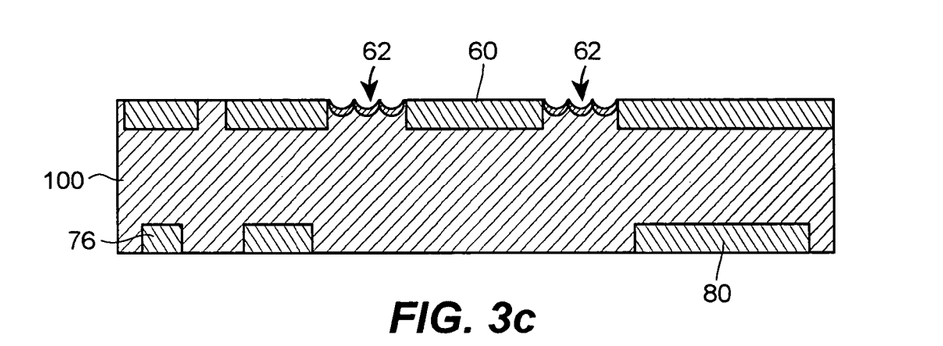

FIG. 3c shows the top substrate assembly after a 3 micron deep boron diffusion (i.e., the shallow boron diffusion) step defines the corrugated membrane 62.

Figure 3D:
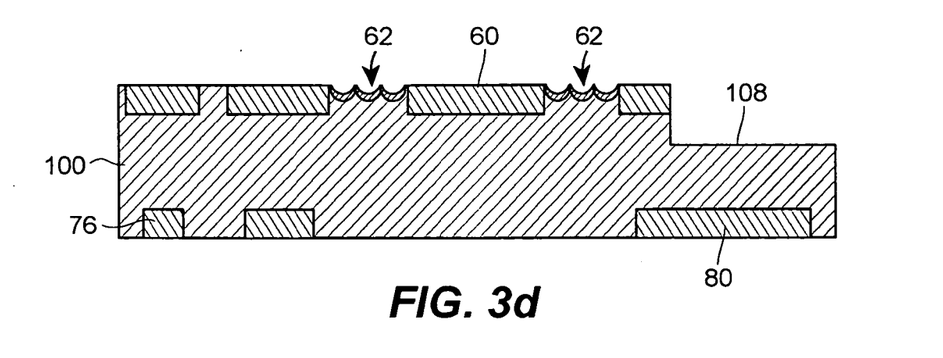

FIG. 3d shows the top substrate assembly after a 250 micron anisotropic dry etch step to create a flow passage outlet region 108 that eventually defines a portion of the flow passage 46 and the fluidic port 50.

Figure 3E:
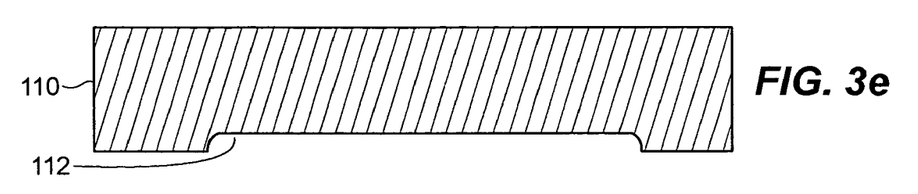
Figure 3F:
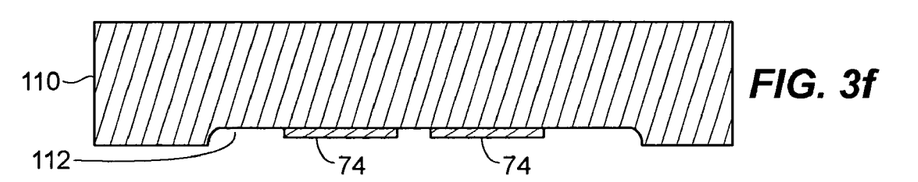
Figure 3G:
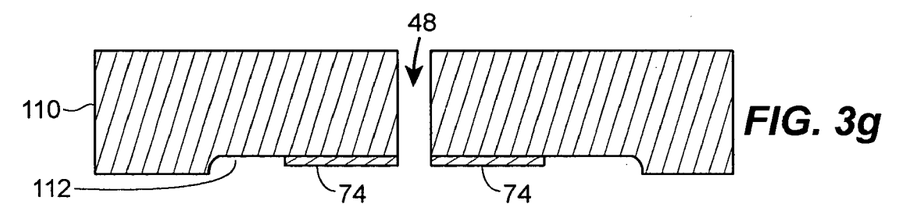

FIGS. 3e–3g show the processing steps associated with the top cap wafer 42. First, an isotropic glass recess etch of approximately 30 microns is performed on a glass substrate 110. Pyrex 7740 glass may be used for the glass substrate 110. A recess region 112 created by the etch step has smooth sidewalls to promote good metal step coverage during a subsequent step in which the top latch electrode 74 is deposited via evaporation along with the line connecting the electrode 74 to the contact 78. FIG. 3f shows the electrode 74 after one or more metal layers have been deposited and patterned. In one embodiment, the electrode 74 includes a chromium layer and a gold layer. FIG. 3g shows the top cap wafer 42 after the fluidic port 48 has been created by a drilling operation or one of a number of glass etching processes well known to those skilled in the art.

Figure 3H:
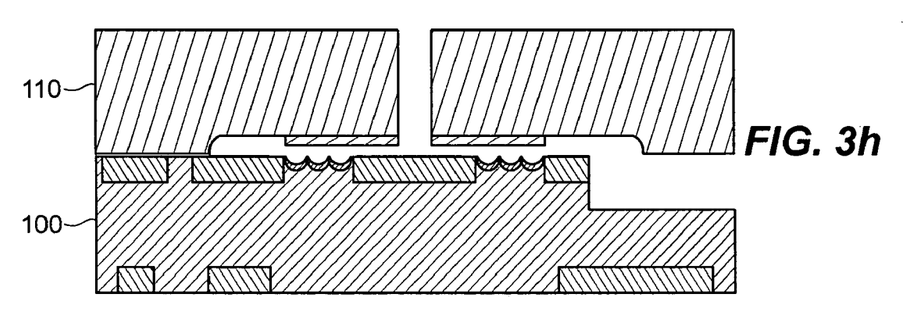

FIG. 3h shows the top substrate assembly after the silicon wafer 100 has been bonded to the glass substrate 110 using a typical anodic bond step performed at 400 degrees Celsius and 1 kV for 5 minutes, in vacuum, and with a 200 N clamping force.

Figure 3I:
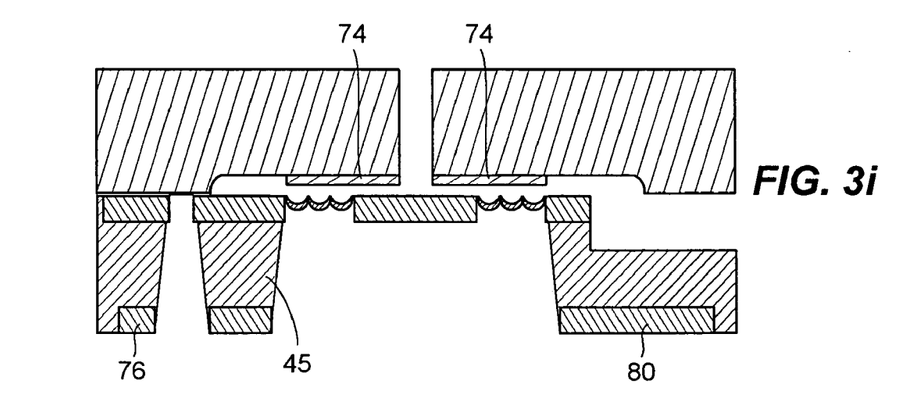

FIG. 3i shows the results of the EDP etch step that releases the valve plate 60 and the corrugated membrane 62, and forms the valve body 45 as well as the lead transfers 76 and 80. The top substrate assembly is now ready for attachment to the bottom substrate assembly.

Figure 4A:
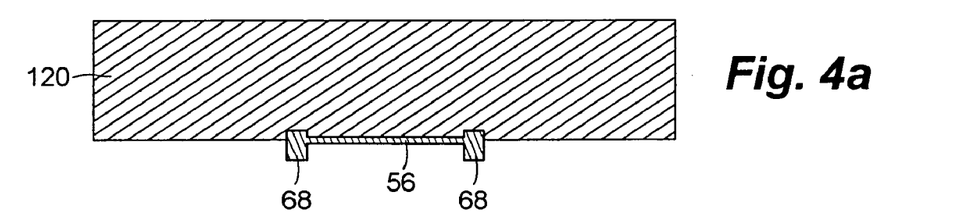
FIGS. 4a–4d are schematic, cross-sectional illustrations of the fabrication sequence for a bottom substrate assembly of the microvalve of FIG. 2.

FIGS. 4a–4d show the process steps related to the bottom substrate assembly. In general, fabrication of the two substrate assemblies includes the same process steps, and may therefore be performed at the same time. FIG. 4a shows the state of the bottom substrate assembly corresponding with the structure shown in FIG. 3c for the other assembly. More particularly, a bottom silicon wafer 120 is processed with the same deep and shallow boron diffusion steps (and corresponding etch step) described above to form what will become the resistive heater 56. The deep boron diffusion step forms the heater posts 68, while the shallow boron diffusion step forms the underlying silicon for the heater elements (e.g., grid) between the heater posts 68.

Figure 4B:
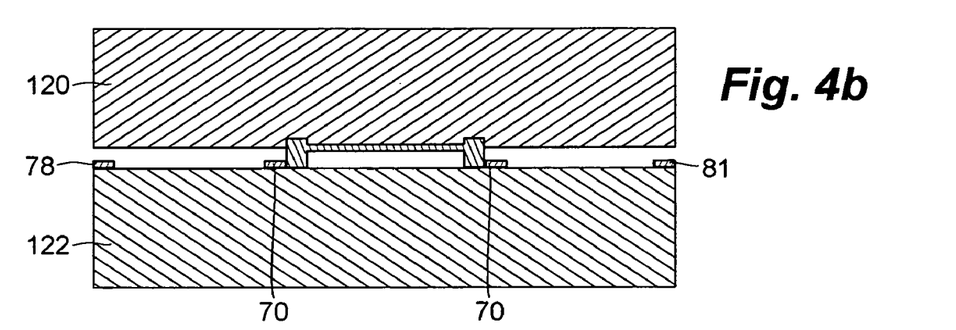

FIG. 4b shows the silicon wafer after an anodic bonding step at wafer level to a glass substrate 122 that has previously been processed with the above-described metallization steps that are performed to create the contacts 70, 78, and 81. This anodic bonding step, among other things, establishes the electrical contact between the metallic layers on the glass substrate and the doped silicon layer of the heater 56.

Figure 4C:
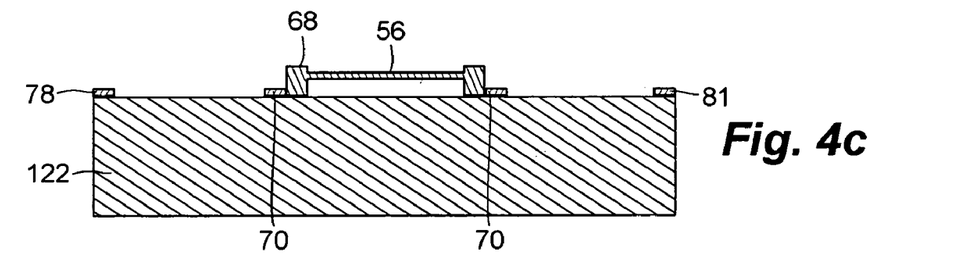
Figure 4D:
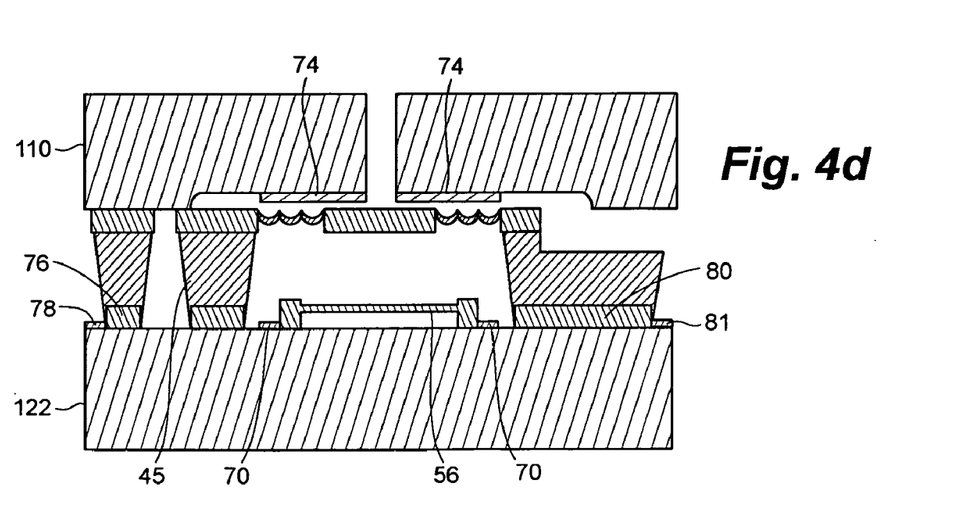

FIG. 4c shows the bottom substrate assembly after a wafer-thinning step (to approximately 120 microns) and a subsequent two-hour EDP etch-back step that dissolves the bulk of the wafer 120, leaving the heater 56 bonded to the glass substrate 122. At this point in the batch process, the glass substrate 122 is diced to separate the number of heaters disposed thereon, and the individual dies are mated to the top substrate assembly shown in FIG. 3i using another anodic or other bonding step. Alternatively, the bond that mates the top and bottom substrate assemblies may be performed at the wafer level. In either case, the mated substrate assemblies are shown in FIG. 4d. After the two substrate assemblies are mated, the cavity 54 may be insulated (if an insulative layer has not already been deposited) with 3 microns of vapor-phase deposited parylene (not shown). After insulator application, the cavity 54 may be partially filled with pentane using a microsyringe inserted through an access channel that will eventually be sealed with epoxy. The insulation and cavity-fill steps may also occur at the wafer level rather than the die level.

In the event that thermopneumatic actuation is utilized, the thermal expansion substance may be pentane or methanol, but many other fluids may be used, such as hexane, Freon, or even water.

Use of a solid thermal expansion substance (regardless of whether it vaporizes with heating) may be advantageous because the solid may be deposited prior to attachment of the two substrate assemblies, thereby avoiding an injection step as well as the need to seal an injection hole. Sealants such as an epoxy may degrade over time through fluid absorption or other material failure, thereby limiting the robustness of the device. It may also be desirable to avoid the injection step to further enhance manufacturability through batch processing.

The sensor circuit 26, the control 36 and any other component providing electronics or logic functionality may, but need not be integrated with the microvalve on a common chip, die, substrate or other medium. For example, the above-described substrate assemblies may be mounted on a board or in a package having one or more other integrated circuit chips or other system components.

Still other modifications and alternative embodiments of the invention will be apparent to those skilled in the art in view of the foregoing description. The description is to be construed as illustrative only, and is for the purpose of teaching those skilled in the art the best mode of carrying out the invention. The details of the structure and method may be varied substantially without departing from the spirit of the invention, and exclusive use of all modifications which come within the scope of the appended claims is reserved.

We claim:

1. A microvalve device comprising:
   a semiconductor-based valve housing that defines a flow passage;
   a valve face disposed within the valve housing and in fluid communication with the flow passage;
   a thermal expansion actuator disposed within the valve housing that drives movement of the valve face from a first position to a second position relative to the flow passage; and
   a capacitor that holds the valve face in the second position;
   an insulating layer disposed on one or more portions of the semiconductor-based valve housing;
   wherein:
   the capacitor comprises a first electrode and a second electrode;
   the first electrode is disposed on the valve face;
   a voltage is applied across the first and second electrodes to electrostatically hold the valve face in the second position; and
   the insulating layer is further disposed between the first and second electrodes to prevent contact of the first and second electrodes when the valve face is moved from the first position to the second position.

2. The microvalve device of claim 1, further comprising a capacitance sensor coupled to the first and second electrodes wherein the capacitance sensor monitors a capacitance level to determine when the valve face reaches the second position.

3. The microvalve device of claim 2, wherein:
   the thermal expansion actuator comprises a heating element; and
   the capacitance sensor generates a signal indicative of the valve face having reached the second position and utilized to discontinue application of power to the heating element.

4. A microvalve device comprising:
   a semiconductor-based valve housing that defines a flow passage;
   a valve face disposed within the valve housing and in fluid communication with the flow passage;
   a thermal expansion actuator disposed within the valve housing that drives movement of the valve face from a first position to a second position relative to the flow passage; and
   a capacitor that holds the valve face in the second position;
   wherein:
   the semiconductor-based valve housing comprises first and second substrates having respective surfaces that define interior walls of an actuation cavity; and
   the semiconductor-based valve housing further comprises an insulating layer disposed on the surfaces of the first and second substrates that define the interior walls of the actuation cavity.

5. The microvalve device of claim 4, wherein the insulating layer comprises parylene.

6. The microvalve device of claim 4, wherein the insulating layer comprises silicon dioxide.

7. A microvalve device having a first stable state and a second stable state, the microvalve device comprising:
   a semiconductor-based valve housing;
   a valve face disposed within the valve housing;
   an actuator having a heating element disposed within the valve housing that displaces the valve face to effect a transition from the first stable state to the second stable state;
   a latch that maintains displacement of the valve face in the second stable state; and
   a sensor that detects when the transition from the first stable state to the second stable state has occurred;
   wherein the sensor generates a signal indicative of the transition which is utilized to discontinue heating by the heating element.

8. The microvalve device of claim 7 wherein:
   the latch comprises a capacitor having a pair of electrodes; and
   a voltage is applied to the pair of electrodes to activate the latch and hold the microvalve device in the second stable state electrostatically.

9. The microvalve device of claim 8 wherein the sensor includes a capacitance level detection circuit coupled to the pair of electrodes.

10. A microvalve device having a first stable state and a second stable state, the microvalve device comprising:
    a semiconductor-based valve housing;
    a valve face disposed within the valve housing;
    an actuator having a heating element disposed within the valve housing that displaces the valve face to effect a transition from the first stable state to the second stable state; and
    a latch that maintains displacement of the valve face in the second stable state;
    wherein:
    the valve housing defines a cavity in which the heating element is disposed;
    the valve housing includes an insulator to insulate the cavity;
    the valve housing comprises first and second substrates having respective surfaces that define interior walls of the cavity; and
    the insulator comprises a layer disposed on the surfaces of the first and second substrates that define the interior walls of the cavity.

11. The microvalve device of claim 10 wherein the latch comprises an electrostatic latch having first and second electrodes, and wherein the layer of the insulator is disposed on the first electrode to act as a dielectric layer between the first and second electrodes when the electrostatic latch is activated.

12. The microvalve device of claim 11, wherein the insulator comprises one of parylene and silicon dioxide.

13. A method of fluid flow control through a passage in a microvalve having a semiconductor-based valve housing and a valve face that rests in a first position, the method comprising the steps of:
provicing for application of power to a thermal expansion actuator disposed within the valve housing to displace the valve face from the first position to a second position;
sensing when the valve face reaches the second position;
activating a latch to maintain the valve face in the second position; and discontinuing the application of power to the thermal expansion actuator after the activating step;
wherein:
the power application providing step comprises the step of heating a thermal expansion substance;

the heating step comprises the step of displacing the valve face pneumatically;
the activating step comprises the step of temporarily providing power to the microvalve to apply a voltage across a capacitor;
the sensing step utilizes electrodes of the capacitor to determine when the valve face reaches the second position; and
the thermal expansion substance is disposed in an insulated cavity such that the discontinuing step is performed prior to substantial heating of portions of the microvalve outside of the insulated cavity.

* * * * *